United States Patent [19]

Arfiche et al.

[11] Patent Number: 5,234,981
[45] Date of Patent: Aug. 10, 1993

[54] HALOGENATED POLYMER COMPOSITIONS STABILIZED WITH THE AID OF AN INORGANIC ADDITIVE

[75] Inventors: Mireille Arfiche, Lagney; Louis Carette, Issy Les Moulineaux; Pierre Pena Porta, Bouc Bel Air; Francois Pouenat, Paris, all of France

[73] Assignee: Rhone-Poulenc Chimie, Cedex, France

[21] Appl. No.: 865,510

[22] Filed: Apr. 9, 1992

[30] Foreign Application Priority Data

Apr. 9, 1991 [FR] France ................. 91 04546

[51] Int. Cl.$^5$ .......................... C08K 5/13; C08K 5/09; C08K 3/26
[52] U.S. Cl. .................... 524/265; 524/399; 524/436
[58] Field of Search ............. 524/399, 436, 265, 387

[56] References Cited

U.S. PATENT DOCUMENTS

| | | | |
|---|---|---|---|
| 2,597,987 | 5/1952 | Harding | 260/45.7 |
| 4,267,083 | 5/1981 | Torloting | 524/399 |
| 4,515,916 | 5/1985 | Molt | 524/436 |
| 4,659,764 | 4/1987 | Isao et al. | 524/436 |
| 4,751,261 | 6/1988 | Miyata et al. | 524/436 |
| 4,761,445 | 8/1988 | Chiba | 524/265 |
| 4,808,649 | 2/1989 | Gay et al. | 524/265 |
| 4,931,492 | 6/1990 | Foster et al. | 524/265 |

FOREIGN PATENT DOCUMENTS

| | | |
|---|---|---|
| 0063180 | 10/1982 | European Pat. Off. . |
| 0256872 | 2/1988 | European Pat. Off. . |
| 2297227 | 1/1975 | France . |
| 2483934 | 9/1980 | France . |

*Primary Examiner*—Veronica P. Hoke
*Attorney, Agent, or Firm*—Ginnegan, Henderson, Farabow, Garrett & Dunner

[57] ABSTRACT

The present invention relates to new stabilized compositions based on halogenated polymers and more specifically on chlorinated polymer. It relates more particularly to stabilized compositions based on chlorinated polymers, which are characterized in that they contain:
  a) an effective quantity of an organic zinc or cadmium compound,
  b) an effective quantity of an organic calcium, magnesium, barium or lanthanide compound, and
  c) an effective quantity of at least one essentially amorphous basic aluminum magnesium carbonate denoted by the formula (I):

$$(MgO)_y \cdot Al_2O_3 \cdot (CO_2)_x \cdot (H_2O)_z \qquad (I).$$

36 Claims, No Drawings

HALOGENATED POLYMER COMPOSITIONS STABILIZED WITH THE AID OF AN INORGANIC ADDITIVE

BACKGROUND OF THE INVENTION

The present invention relates to new stabilized compositions based on halogenated polymers and more specifically on chlorinated polymers. Halogenated polymers tend to dehydrohalogenate to release hydrohalogenic acid when being processed with heat; this results in the formation of polyene double bonds which are responsible for coloring the polymers.

Chlorinated polymers, for example, especially polyvinyl chloride (PVC), dehydrochlorinate to release hydrochloric acid when processed with heat. Numerous additives have been recommended to deal with this problem, on the one hand to limit the formation of hydrochloric acid or to fix it and on the other hand to decelerate the propagation of polyene double bonds. Reference may be made, for example, to the work *The Stabilization of Polyvinyl Chlorides* by F. Chevassus (Amphora Publications, 1957).

Organic zinc and cadmium compounds, particularly in combination with organic compounds of calcium, barium or magnesium, are widely employed as basic stabilizers for chlorinated polymers. In most cases, however, these compounds need to be used in combination with other stabilizers, sometimes called secondary stabilizers. French Patent FR-A-2,297,227 describes PVC compositions stabilized effectively by organic metal salts, e.g., salts of zinc, calcium and barium, and a $\beta$-diketone. French Patent FR-A-2,483,934 recommends the use of a hydrotalcite with a zinc compound, but the results were poor with respect to the color of the PVC. European Patent EP-A-63,180 proposes employing organic metal salts, a $\beta$-diketone or a metal enolate of $\beta$-diketone, and a hydrotalcite. The presence of hydrotalcite in these stabilizing compositions does not contribute any significant advantage with regard to yellowing during the processing of the polymer with heat.

Now, it is necessary to have a period of absence of color, or of slow color development which is as long as possible, during the processing of the chlorinated polymer with heat, especially in the case of applications in which a transparent and a colorless, or faintly colored, appearance of the shaped object are required. This is sometimes called the available working range.

The present invention provides a solution to this problem of lengthening of the working range.

SUMMARY OF THE INVENTION

The present invention relates to stabilized compositions based on chlorinated polymers comprising:
a) an effective quantity of an organic zinc or cadmium compound,
b) an effective quantity of an organic calcium, magnesium, barium or lanthanide compound, and
c) an effective quantity of at least one amorphous basic aluminium magnesium carbonate, represented by the formula (I):

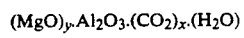   (I)

wherein:

y denotes, in moles, a whole or fractional number such that $y \leq 1.7$,
x denotes, in moles, a whole or fractional number such that $x \leq 0.7$, and
z denotes a whole or fractional number greater than or equal to 3.

DESCRIPTION OF THE PREFERRED EMBODIMENTS

The essentially amorphous basic aluminium magnesium carbonates of the present invention are non-crystalline compounds in contrast to the hydrotalcites of the prior art. The analysis of the one-dimensional structure of these compounds is generally interpreted to be a structure of monoatomic MgO layers of the brucite type alternating with monoatomic layers of aluminium carbonates.

According to X-ray diffraction analyses, the basic aluminium magnesium carbonates of the invention consist of magnesium oxide, magnesium hydroxide or magnesium carbonate surrounded by amorphous basic aluminum carbonate and/or hydroxide. It is in this sense that amorphous or essentially amorphous compounds are referred to in the present text: magnesium oxide or magnesium hydroxide has a crystalline structure, but the whole of the compound of formula (I) does not have a crystalline structure. Accordingly, in formula (I), by amorphous it is meant that at least 75%, advantageously 90%, preferably 95%, most preferably 99%, of the aluminum is in amorphous form, i.e., in non-crystalline form, while the magnesium species is crystalline. According to the invention, in order to prevent the aluminum species from becoming crystalline, it is advantageous to add polyols, preferably polyols having 6 carbon atoms, most preferably sugars. Among the sugars, the preferred are those of the sorbitol family. The concentration of the polyol(s) is in the range of 0.1 to 20%, generally at least 0.25%, and preferably 1 to 10%, relative to the basic aluminum magenesium carbonate.

The amorphous basic aluminium magnesium carbonates of formula (I) can be prepared by coprecipitation, in the appropriate proportions, of a basic aluminium carbonate (or aluminium hydroxycarbonate) with a magnesium derivative, such as magnesium hydroxide or magnesium carbonate.

The coprecipitates thus obtained may have added to them various compounds which form a kind of coating on the particles of the basic aluminum magnesium carbonate of formula (I), although this coating is not required for the compounds of formula (I) to act as stabilizers. It is thus possible, for example, to add stearic acid or one of its derivatives, especially metal stearates, or a polyol such as sorbitol. These compounds make it possible to improve the dispersion of the basic aluminum magnesium carbonate in the chlorinated polymer or, if necessary, to improve the stability of the carbonate.

The drying of the basic aluminum magnesium carbonate is conducted so as to achieve the desired moisture content.

The compositions according to the invention generally contain from 0.005% to 5% by weight of amorphous basic aluminum magnesium carbonate of formula (I) in relation to the weight of chlorinated polymer, preferably from 0.01% to 2% by weight.

The chlorinated polymers are preferably polyvinyl chloride (PVC), polyvinylidene chloride, copolymers containing predominantly vinyl chloride units obtained from vinyl chloride and other monomers, and mixtures of polymers or copolymers in which a predominant part is obtained from vinyl chloride.

As a general rule, any kind of PVC is suitable for use in the present invention, irrespective of its method of preparation: polymerization in bulk, in suspension, in emulsion or of any other type, and whatever its intrinsic viscosity.

The vinyl chloride homopolymers may also be modified chemically, for example by chlorination.

Many vinyl chloride copolymers can also be stabilized against the effects of heat, i.e., yellowing and degradation. These are, in particular, the copolymers obtained by copolymerization of vinyl chloride with other monomers containing a polymerizable ethylenic bond, e.g., vinyl acetate or vinylidene chloride, maleic or fumaric acid or their esters, olefins such as ethylene, propylene and hexane, acrylic or methacrylic esters, styrene and vinyl ethers such as vinyl dodecyl ether. These copolymers usually contain at least 50% by weight of vinyl chloride units and preferably at least 80% by weight of vinyl chloride units.

The compositions according to the invention may also contain mixtures based on chlorinated polymers containing minor quantities of other polymers, such as halogenated polyolefins or acrylonitrile/butadiene/styrene copolymers.

PVC, by itself or mixed with other polymers, is the chlorinated polymer most widely employed in the compositions of the invention.

The organic zinc or cadmium compounds for use in the present invention include zinc or cadmium carboxylates and phenolates. The most commonly employed zinc or cadmium compounds are the zinc or cadmium salts of maleic, acetic, diacetic, propionic, hexanoic, 2-ethylhexanoic, decanoic, undecanoic, lauric, myristic, palmitic, stearic, oleic, ricinoleic, behenic (docosanoic), hydroxystearic, hydroxyundecanoic, benzoic, phenylacetic, para-tert-butylbenzoic and salicylic acids, and zinc phenolates from phenol and phenols substituted by one or more alkyl radicals, such as nonylphenols.

For practical or economic reasons the preferred choices among the organic zinc compounds referred to above are zinc propionate, zinc 2-ethylhexanoate, zinc laurate, zinc stearate, zinc oleate, zinc ricinoleate, zinc docosanoate, zinc benzoate, zinc para-tert-butylbenzoate, zinc salicylate, zinc mono(2-ethylhexyl) maleate, zinc nonylphenates and, among the organic cadmium compounds referred to above, the preferred compounds are cadmium propionate, cadmium 2-ethylhexanoate, cadmium laurate, cadmium stearate, cadmium oleate, cadmium ricinoleate, cadmium docosanoate, cadmium benzoate, cadmium para-tert-butylbenzoate, cadmium salicylate, cadmium mono(2-ethylhexyl) maleate and cadmium nonylphenates. The organic zinc or cadmium compounds generally comprise from 0.005% to 1% by weight relative to the chlorinated polymer, preferably from 0.01% to 0.6% by weight.

With regard to toxicity, cadmium compounds, although effective, are prohibited from use in certain applications, especially alimentary ones.

The compositions of the invention therefore preferably contain organic zinc compounds.

The organic compounds of calcium, magnesium, barium and lanthanides are preferably the carboxylates and the phenolates of these metals. Those most commonly employed are the calcium, magnesium, barium and lanthanide salts of maleic, acetic, diacetic, propionic, hexanoic, 2-ethylhexanoic, decanoic, undecanoic, lauric, myristic, palmitic, stearic, oleic, ricinoleic, behenic (docosanoic), hydroxystearic, hydroxyundecanoic, benzoic, phenylacetic, para-tert-butylbenzoic and salicylic acids, and the calcium, magnesium, barium and lanthanide phenolates from phenol and phenols substituted by one or more alkyl radicals, such as nonylphenols.

For practical or economic reasons, the preferred choices among the organic calcium, magnesium, barium and lanthanide compounds referred to above are the salts of propionic, 2-ethylhexanoic, lauric, stearic, oleic, ricinoleic, docosanoic, benzoic, para-tert-butylbenzoic and salicylic acids and the mono(2-ethylhexyl) maleates and the nonylphenates of these metals. The organic calcium, magnesium, barium and lanthanide compounds generally comprise from 0.005% to 5% by weight relative to the weight of the chlorinated polymer, preferably from 0.02% to 2% by weight.

Organic calcium compounds, or mixtures of organic calcium compounds and organic magnesium compounds, will preferably be employed for alimentary applications, especially PVC bottles.

For better stabilization of the compositions based on chlorinated polymer, these will preferably contain at least one secondary organic stabilizer. Among organic secondary stabilizers, $\beta$-diketones or $\beta$-ketoaldehydes are particularly effective. These $\beta$-ketones have been described in French Patents and Certificates of Addition published under the numbers FR-A-2,292,227, FR-A-2,324,681, FR-A-2,351,149, FR-A-2,352,025, FR-A-2,383,988 and FR-A-2,456,132 and in European Patents EP-A-0,040,286 and EP-A-0,046,161.

Examples of suitable $\beta$-diketones which may be used in the instant invention include benzoylstearoylmethane, dibenzoylmethane, benzoylacetone, lauroylacetone, decanoylacetone, benzoyl-3-methylbutanoylmethane, methoxycarbonylbenzoylbenzoylmethanes and bis-$\beta$-diketones such as 1,4bis(acetylaceto)butane, 1,8-bis(benzoyl-aceto)octane and 1,4-bis(acetyl-aceto)benzene. The $\beta$-diketones generally comprise from 0.0005% to 5% by weight relative to the weight of the chlorinated polymer, preferably from 0.01% to 2% by weight.

1,4-Dihydropyridines are also organic stabilizers which may be employed in the compositions of the invention. These compounds are generally monomeric 1,4-dihydro-2,6-dimethyl-3,5-pyridinedicarboxylates, such as those described in French Patents published under the numbers FR-A-2,239,496, FR-A-2,405,974 and FR-A-2,405,937, or polymeric ones, for example, those described in Patent EP-A-0,286,887. These 1,4-dihydropyridines are usually effective in concentrations of 0.01% to 5% by weight relative to the weight of chlorinated polymer, preferably from 0.05% to 2% by weight per weight.

$\beta$-Diketones or $\beta$-ketoaldehydes can also be employed jointly with 1,4-dihydropyridines. The overall quantities of these mixtures of compounds are then those shown for each of them respectively.

Among the other organic stabilizers which may be employed in the compositions according to the invention, there may be mentioned:
$\beta$-ketoesters, particularly esters of ketoacetic acids, as described in Patents FR-A-1,435,882 and U.S. 2,669,548;
2-phenylindole and its derivatives, like those described in Patents published under the numbers FR-A-2,273,841, FR-A-2,275,461 and FR-A-2,313,422;

β-aminocrotonic esters, particularly $C_{12}$–$C_{20}$ alkyl β-aminocrotonates and thioalkylene glycol β-aminocrotonates;

urea and its derivatives, e.g., phenylurea, and thiourea and its derivatives, such as diphenylthiourea;
esters of mercaptocarboxylic acids, particularly:
esters of thioglycolic acid, like those described in FR-A-2,459,816,
diesters of thiomalic acid, like those described in EP-A-0,090,748,
esters of 2-mercaptopropionic acid, like those described in FR-A-2,552,440.

The organic stabilisers indicated above, when employed, comprise from 0.01% to 5% by weight relative to the weight of the chlorinated polymer, preferably from 0.05% to 2% by weight per weight.

The compositions of the invention may include other organic secondary heat stabilizers, such as γ-hydroxyalkylated polyorganosiloxane oils, polyols and phosphites.

The γ-hydroxyalkylated polyorganosiloxane oils are preferably those which correspond to the general formula (II)

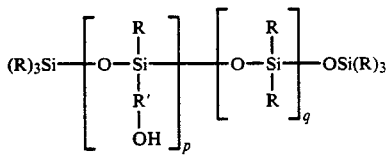

(II)

wherein:
the radicals R, which may be the same or different, denote a methyl or phenyl radical, at least 60 mol% of which are methyl radicals;
R' denotes a linear or branched alkylene radical containing from 2 to 6 carbon atoms;
p denotes an average number from 1 to 30; and
q denotes an average number from 1 to 100.

The oils preferably employed are those of formula (II) wherein:
R denotes a methyl radical;
R' denotes a trimethylene or 2-methyltrimethylene radical;
p denotes an average number from 2 to 20; and
q denotes an average number from 2 to 30.

The γ-hydroxyalkylated polyorganosiloxane oils generally comprise up to 5% by weight relative to the weight of the chlorinated polymer, preferably from 0.01% to 2% by weight. The presence of γ-hydroxyalkylated polyorganosiloxane oils makes it possible to lower appreciably the quantity of internal lubricants in the compositions, e.g., hydrogenated castor oil, mixed lubricants, e.g., ester waxes, and external lubricants, while improving the impact strength of the polymer.

The polyols generally have the advantage of lengthening the lifetime of chlorinated polymers subjected to a heat treatment. It is preferred that the polyols employed in the present invention should have a boiling point higher than 150° C., more preferably higher than 170° C., because of the use of chlorinated polymers at elevated temperatures.

Examples of suitable polyols include triols like trimethylolpropane, glycerol, 1,2,6-hexanetriol, 1,2,4-butanetriol or trishydroxyethyl isocyanurate, tetrols like pentaerythritol or diglycerol, pentitols like xylitol or tetramethylolcyclohexanol, hexitols like mannitol, sorbitol or dipentaerythritol, polyols which are partially esterified with a carboxylic acid and in the formula of which at least 3 hydroxyl functional groups are free, and polyvinylalcohols, especially those in which there remains less than 30 mol% of ester groups relative to the total of their ester and hydroxyl groups. Among these polyols the preferred ones are xylitol, mannitol, sorbitol, trimethylolpropane, tetramethylolcyclohexanol and the polyvinylalcohols defined above.

When present in the compositions according to the invention, the polyols generally comprise from 0.005% to 1% by weight relative to the chlorinated polymer, preferably from 0.01% to 0.6% by weight.

The compositions according to the invention may also contain organic phosphites, especially aliphatic phosphites or aromatic phosphites or mixed aliphatic and aromatic phosphites. When present, the phosphite generally comprises from 0.05% to 5% by weight relative to the chlorinated polymer, preferably from 0.1% to 2% by weight.

The compositions according to the invention may also contain the usual adjuvants such as phenolic antioxidants, anti-UV agents such as benzophenones, benzotriazoles or stearically hindered amines (usually known under the designation of HALS).

The compositions of the invention may also contain epoxides, preferably epoxidized polyglycerides such as epoxidized soya oil, epoxidized linseed oil, epoxidized fish oils or epoxidized tallol. When present, the epoxides usually comprise 0.05% to 5% by weight relative to the weight of the chlorinated polymer, preferably from 0.1% to 2% by weight.

The compositions according to the instant invention may be rigid formulations, i.e., without plasticizer, or semirigid ones, i.e., with reduced plasticizer contents, such as for applications in the building industry, the manufacture of various parts or electrical wiring, or, in the case of compositions containing only alimentary additives, for the manufacture of bottles. These formulations in most cases contain an impact improver such as a methacrylate/butadiene/styrene copolymer.

The present compositions may also be plasticized formulations such as those for the manufacture of films for agricultural use. The plasticizers employed are known compounds such as alkyl phthalates. Di(2-ethylhexyl) phthalate (usually called dioctyl phthalate) is most often employed. When the compositions of the present invention contain a plasticizer, the content thereof is generally from 5% to 120% by weight relative to the weight of chlorinated polymer.

The incorporation of the various stabilizers or adjuvants is usually carried out on the chlorinated polymer in powder form. It is possible, of course, to prepare a mixture of 2 or more of the constituents of the compositions according to the invention before incorporating them into the chlorinated polymer. Any of the usual methods for incorporating the various stabilizers or adjuvants into the polymer can be employed. For example, the homogenization of the polymeric composition may be carried out on a kneader or roll mill, at a temperature such that the composition becomes fluid, normally between 150° C. and 200° C. in the case of PVC, and for a sufficient time, on the order of a few minutes to a few tens of minutes. The chlorinated polymer, and more particularly PVC, compositions may be processed by any of the techniques usually employed, e.g., extrusion, injection molding, blow-extrusion, calendering or rotational molding.

The examples which follow serve to illustrate the invention and should not be construed as limiting.

EXAMPLE 1

Preparation of a basic aluminum magnesium carbonate.

An aqueous gel containing 608 g of magnesium hydroxide was introduced into a 5000 ml beaker with stirring at 200 revolutions/minute.

An aqueous gel containing 2915 g of aluminum hydroxycarbonate was then added over 5 minutes. The mixture was stirred for approximately 30 minutes at room temperature.

The mixture was subsequently dried in an oven for 2 hours at 70° C. A white powder of general formula (I) was obtained with:

$x = 0.37$,
$y = 0.84$, and
$z = 6.54$.

The mean particle size of the particles of this compound was 3 micrometers.

A sample was examined by X-ray diffraction. The diffraction spectrum showed a crystallized and relatively intense phase corresponding to magnesium hydroxide. No diffraction peak corresponding to aluminum hydroxide and/or carbonate was seen; therefore, the compounds were of an amorphous nature.

EXAMPLE 2

Preparation of a basic aluminum magnesium carbonate.

1080 g of an aqueous magnesium carbonate gel (which had a concentration of 6% by weight per weight, expressed as magnesium hydroxide) were charged into a 5 liter reactor fitted with a stirrer.

This was stirred slowly and 2520 g of an aqueous aluminum hydroxide gel (which had a concentration of 9% by weight per weight, expressed as $Al_2O_3$) were added.

High speed stirring was then carried out for 10 minutes.

The resulting mixture was spray dried (outlet temperature: 100° C.).

The basic aluminum magnesium carbonate of formula (I) exhibited the following characteristics:

$x = 0.65$ ($CO_2/Al_2O_3$ molar ratio),
$y = 0.47$ ($MgO/Al_2O_3$ molar ratio), and
$z = 5.18$ ($H_2$)/$Al_2O_3$ molar ratio).

A sample was examined by X-ray diffraction. The diffraction spectrum showed a relatively low intensity phase corresponding to $MgCO_3.3H_2O$. No diffraction peak corresponding to aluminum hydroxide and/or carbonate was seen; therefore, the compounds were of an amorphous nature.

EXAMPLES 3 AND 4 AND COMPARATIVE TEST A

Four formulations were prepared by homogenization at room temperature, in a fast mixer, of the following different constituents:

| | |
|---|---|
| PVC prepared by suspension polymerization, exhibiting a K value of 60 | 100 g |
| impact improver (methacrylate/butadine/styrene copolymer) | 7 g |
| $TiO_2$ | 4 g |
| $CaCO_3$ | 4 g |
| lubricants Wax E and Wax OP (alkyl ester waxes containing a long fatty acid chain) | 1 g |
| Trimethylolpropane | 0.2 g |
| Zn stearate | 0.6 g |
| Ca docosanoate | 0.5 g |
| Dibenzoylmethane | 0.1 g |
| Epoxidized soya oil | see Table 1 |
| Hydrotalcite [$Mg_{4.5}Al_2(OH)_{13}CO_3.3.5H_2O$] | see Table 1 |
| Basic Al Mg coarbonate of formula (I) as prepared in Example 1 or Example 2 | see Table 1 |

The time needed for good homogenization was approximately 10 minutes.

The homogeneous mixtures thus obtained were introuced into a plastograph (Brabender) consisting of a heated vessel in which counterrotating blades rotate in order to knead the polymer and the additives. The vessel contained 32 g of composition; the temperature was maintained at 180° C. and the rate of rotation of the blades was 60 revolutions/min.

Samples were taken after 5 min. and 10 min. of kneading under these conditions and the color of the samples taken was measured with a Minolta colorimeter and expressed as a yellowing index according to ASTM standard D 1925-70 (the higher the value of this index, the more colored is the sample).

The yellowing indices thus measured for each of the formulations and the lengths of time in minutes after which these formulations became black during the treatment of 180° C. (long term stability) are collated in Table 1 below.

It should be noted that with basic aluminium magnesium carbonates the rate of development of color on heating (yellowing) is decreased when compared with test A containing hydrotalcite; this deceleration of the yellowing is a parameter of great importance.

TABLE 1

| TESTS | Epoxidized soya oil | Hydrotalcite | Basic Al Mg carbonate | YELLOWING INDEX For 5 min | For 10 min | Black at |
|---|---|---|---|---|---|---|
| Control 1 | 0.7 g | 0 g | 0 g | 4.5 | 5.7 | 15 min |
| Example 3 | 0.5 g | 0 g | 0.2 g (Example 1) | 4.2 | 5.5 | 20 min |
| Example 4 | 0.5 g | 0 g | 0.2 g (Example 2) | 5.2 | 7.1 | 20 min |
| Test A | 0.5 g | 0.2 g | 0 g | 7.6 | 8.3 | 25 min |

EXAMPLES 5 to 7

Four formulations containing the following constituents were prepared by following the operating procedure described in Examples 3 and 4:

| | |
|---|---|
| PVC prepared in suspension, of K value = 60 | 100 g |

| -continued | |
|---|---|
| impact improver | 7 g |
| TiO$_2$ | 4 g |
| CaCO$_3$ | 4 g |
| lubricants Wax E and Wax OP | 1 g |
| Calcium stearate | 0.4 g |
| Cadmium laurate/barium laurate (weight ratio 2/1) | see Table 2 |
| Epoxidized soya oil | see Table 2 |
| Basic Al Mg carbonate of formula (I) as prepared in Example 1 | see Table 2 |

The yellowing indices measured for each of the formulations and the times of the treatment at 180° C. needed for the formulations to become black are collated in Table 2 below.

The examples with a basic Al Mg carbonate of formula (I) exhibited a change in the color on heating which is slower than in the case of the control, while having an equal or higher long-term stability. These results were obtained while decreasing the quantity of Cd/Ba stabilizer or epoxidized soya oil.

TABLE 2

| TESTS | Cd/Ba Stabilizer | Epoxidized soya oil | Basic Al Mg carbonate | YELLOWING INDEX | | | Black at |
|---|---|---|---|---|---|---|---|
| | | | | For 5 min | For 10 min | For 15 min | |
| Control 2 | 2.5 g | 1 g | 0 g | 9.24 | 12.47 | 16.93 | 35 min |
| Example 5 | 2 g | 1 g | 0.5 g | 8.72 | 10.58 | 13.91 | 45 min |
| Example 6 | 2.5 g | 0.5 g | 0.5 g | 8.55 | 10.89 | 14.6 | 40 min |
| Example 7 | 2 g | 0 g | 0.5 g | 7.44 | 10.84 | 15.66 | 35 min |

EXAMPLES 8 TO 9 AND COMPARATIVE TEST B

Four formulations containing the following constituents were prepared by following the operating procedure described in Examples 3 and 4:

| PVC prepared by polymerisation in suspension, exhibiting a K value = 57 | 100 g |
|---|---|
| impact improver (methacrylate/butadiene/styrene copolymer) | 8 g |
| processing aid (acrylic polymer) | 0.4 g |
| Hydrogenated castor oil | 1.2 g |
| Wax OP lubricant | 0.4 g |
| Zn octanoate | 0.12 g |
| Ca docosanoate | 0.2 g |
| Ca stearate | 0.15 g |
| Stearoylbenzoylmethane | 0.2 g |
| 3,5-Bis(lauroylcarbonyl)-2,6-dimethyl-1,4-dihydropyridine | 0.05 g |
| Epoxidized soya oil | 5.5 g |
| Hydrotalcite [Mg$_{4.5}$Al$_2$(OH)$_{13}$CO$_3$.3.5H$_2$O] | see Table 3 |
| Basic Al Mg carbonate of formula (I) as prepared in Example 1 or Example 2 | see Table 3 |

The yellowing indices measured for each of the formulations and the times of the treatment at 180° C. needed for the formulations to become black are collated in Table 3 below.

In comparison with control 3, the presence of basic Al Mg carbonate allowed the long-term stability to be increased while decreasing the rate of change in color on heating (deceleration of yellowing).

The test containing a hydrotalcite exhibited a higher long-term stability than the examples with the basic Al Mg carbonate, but the fast change in color on heating makes this characteristic of no practical interest.

TABLE 3

| TESTS | Hydrotalcite | Basic Al Mg carbonate | YELLOWING INDEX | | | Black at |
|---|---|---|---|---|---|---|
| | | | For 5 min | For 10 min | For 15 min | |
| Control 3 | 0 | 0 | 30 | 35 | 50 | 60 min |
| Example 8 | 0 | 0.2 g (Example 1) | 31 | 34 | 44 | 80 min |
| Example 9 | 0 | 0.2 g (Example 2) | 29 | 34 | 40 | 85 min |
| Test B | 0.2 g | 0 | 42 | 41 | 44 | 100 min |

EXAMPLES 10 to 12

Three formulations were prepared by homogenization at room temperature, in a fast mixer, of the following different constituents:

| PVC prepared by suspension polymerization, exhibiting a K value of 60 | 100 g |
|---|---|
| impact improver (methacrylate/butadiene/styrene copolymer) | 7 g |
| TiO$_2$ | 4 g |
| CaCO$_3$ | 4 g |
| lubricants Wax E and Wax OP (alkyl ester waxes containing a long fatty acid chain) | 1 g |
| Ca stearate | 0.5 g |
| Zn stearate | 0.5 g |
| Rhodiastab 83 ™ | 0.1 g |
| Organic phosphite | 0.5 g |
| HAS (Sodium silico-aluminate) | see Table 4 |
| Al Mg carbonate | see Table 4 |

The time needed for good homogenization was approximately 10 minutes.

The homogeneous mixtures thus obtained were introduced into a plastograph (Brabender) consisting of a heated vessel in which counterrotating blades rotate in order to knead the polymer and the additives. The vessel contained 32 g of composition; the temperature was maintained at 180° C. and the rate of rotation of the blades was 60 revolutions/minute.

Samples were taken after 5 min., 10 min. and 15 min. of kneading under these conditions and the color of the samples taken was measured with a Minolta colorimeter and expressed as a yellowing index according to ASTM standard D 1925-70 (the higher the value of this index, the more colored is the sample).

The yellowing indices thus measured for each of the formulations and the lengths of time in minutes after which these formulations became black during the treatment at 180° C. (long-time stability) are collated in Table 4 below.

TABLE 4

| TESTS | HAS | Al Mg Carbonate | Yellowing Index | | | Black at |
| --- | --- | --- | --- | --- | --- | --- |
| | | | For 5 min | For 10 min | For 15 min | |
| Control 1 | 0.5 g | 0 g | 2.61 | 3.31 | 4.76 | 19 min |
| Example 10 | 0 g | 0.5 g | 6.01 | 5.64 | 6.36 | 24.5 min |
| Example 11 | 0 g | 0.5 g | 5.88 | 6.38 | 6.35 | 22 min |
| Example 12 | 0 g | 0.5 g | 2.93 | 3.69 | 4.16 | 25.5 min |

Example 10: Formula containing $Al_2O_3$ with traces of MgO.
Example 11: Formula containing $Al_2O_3$ with traces of MgO.
Example 12: Formula containing 35% $Al_2O_3$, 12% MgO, and sorbitol.

What is claimed is:

1. Stabilized compositions based on chlorinated polymer comprising:
   (a) an effective amount of an organic zinc or cadmium compound,
   (b) an effective amount of an organic calcium, magnesium, barium or lanthanide compound, and
   (c) an effective amount of at least one amorphous basic aluminum magnesium carbonate, represented by formula (I):

$$(MgO)_y \cdot Al_2O_3 \cdot (CO_2)_x \cdot (H_2O)_z \quad (I)$$

wherein:
   y denotes, in moles, a whole or fractional number such that $y \leq 1.7$,
   x denotes, in moles, a whole or fractional number such that $x \leq 0.7$, and
   z denotes a whole or fractional number greater than or equal to 3.

2. Compositions according to claim 1, wherein the chlorinated polymer is selected from the group consisting of polyvinyl chloride, polyvinylidene chloride, copolymers containing predominantly vinyl chloride units obtained from vinyl chloride and other monomers, and mixtures of polymers or copolymers in which a predominant part is obtained from vinyl chloride.

3. Compositions according to claim 1, wherein the organic zinc or cadmium compounds are zinc carboxylates or phenolates and cadmium carboxylates or phenolates.

4. Compositions according to claim 1, wherein the organic calcium, magnesium, barium or lanthanide compound is a carboxylate or phenolate of the metal.

5. Compositions according to claim 1, comprising from 0.005% to 5% by weight of amorphous basic aluminium magnesium carbonate of formula (I) relative to the weight of chlorinated polymer.

6. Compositions according to claim 5, comprising from 0.01% to 2% by weight of the amorphous basic aluminum magnesium carbonate relative to the weight of chlorinated polymer.

7. Compositions according to claim 1, wherein:
   the organic zinc or cadmium compound comprises from 0.005% to 1% by weight relative to the chlorinated polymer;
   the organic cadmium, magnesium, barium or lanthanide compound comprises from 0.005% to 5% by weight relative to the weight of the chlorinated polymer.

8. Compositions according to claim 7, wherein:
   the organic zinc or cadmium compound 0.01% to 0.6% by weight relative to the weight of the chlorinated polymer.
   the organic cadmium, magnesium, barium or lanthanide compound comprises from 0.02% to 2% by weight relative to the weight of the chlorinated polymer.

9. Compositions according to claim 1, further comprising at least one secondary organic stabilizer.

10. Compositions according to claim 9, wherein the secondary organic stablizer is selected from the group consisting of a β-diketone, a β-ketoaldehyde and a 1,4-dihydro-2,6-dimethyl-3,5-pyridinedicarboxylate.

11. Compositions according to claim 10, wherein the β-diketone is selected from the group consisting of benzoylstearoylmethane, dibenzoylmethane, benzoylacetone, benzoyl-3-methylbutanoylmethane, methoxycarbonylbenzoylbenzoylmethanes, 1,4-bis-(acetylaceto)butane, 1,8-bis(benzoylaceto)octane and 1,4-bis(acetylaceto)benzene.

12. Compositions according to claim 10, wherein the β-diketone or the β-ketoaldehyde comprises from 0.005% to 5% by weight relative to the weight of the chlorinated polymer.

13. Compositions according to claim 12, wherein the β-diketone or the β-ketoaldehyde comprises from 0.01% to 2% by weight per weight.

14. Compositions according to claim 10, wherein the 1,4-dihydro-2,6-dimethyl-3,5-pyridinedicarboxylate comprises from 0.01% to 5% by weight relative to the weight of the chlorinated polymer.

15. Compositions according to claim 14, wherein the 1,4-dihydro-2,6-dimethyl-3,5-pyridinedicarboxylate comprises from 0.05% to 2% by weight relative to the weight of the chlorinated polymer.

16. Compositions according to claim 9, wherein the secondary organic stabilizer is selected from the group consisting of a β-ketoester, 2-phenylindole or a derivatives thereof, a β-aminocrotonic ester, urea or a derivative thereof, thiourea or a derivative thereof, and esters of a mercaptocarboxylic acid.

17. Compositions according to claim 16, wherein the secondary organic stabilizers comprise from 0.01% to 5% by weight relative to the weight of the chlorinated polymer.

18. Compositions according to claim 17, wherein the secondary organic stabilizers comprise from 0.05% to 2% by weight relative to the weight of the chlorinated polymer.

19. Compositions according to claim 9, wherein the secondary organic stabilizer is a γ-hydroxyalkylated polyorganosiloxane oil of general formula (II):

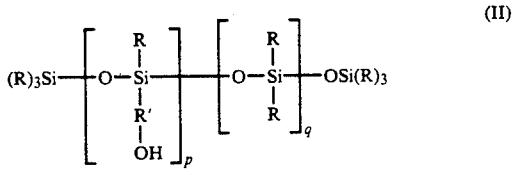

wherein:

the radicals R, which are the same or different, denote a methyl or phenyl radical, at least 60 mol% of which are methyl radicals;

R' denotes a linear or branched alkylene radical containing 2 to 6 carbon atoms;

p denotes an average number from 1 to 30; and q denotes an average number from 1 to 100.

20. Compositions according to claim 19, wherein the secondary organic stabilizer is a γ-hydroxyalkylated polyorganosiloxane oil of general formula (II) wherein:

R denotes a methyl radical;

R' denotes a trimetylene or 2-methyltrimethylene radical;

p denotes an average number from 2 to 20; and q denotes an average number from 2 to 30.

21. Compositions according to claim 19, wherein the γ-hydroxyalkylated polyorganosiloxane oil of general formula (II) comprises up to 5% by weight relative to the weight of the chlorinated polymer.

22. Compositions according to claim 21, wherein the γ-hydroxyalkylated polyorganosiloxane oil of general formula (II) comprises from 0.01% to 2% by weight relative to the weight of the chlorinated polymer.

23. Compositions according to claim 9, wherein the secondary organic stabilizer is a polyol.

24. Compositions according to claim 23, wherein the polyol has a boiling point higher than 150° C.

25. Compositions according to claim 24, wherein the polyol has a boiling point higher than 170° C.

26. Compositions according to claim 23, wherein the polyol is selected from the group consisting of xylitol, mannitol, sorbitol, trimethylolpropane, tetramethylolcyclohexanol, and polyvinylalcohols having less than 30 mol% of ester groups relative to their total of ester and hydroxyl groups.

27. Compositions according claim 26, wherein the polyol is sorbitol.

28. Compositions according to claim 23, wherein the polyol comprises from 0.005% to 1% by weight relative to the weight of the chlorinated polymer.

29. Compositions according to claim 28, wherein the polyol comprises from 0.01% to 0.6% by weight relative to the weight of the chlorinated polymer.

30. Compositions according to claim 9, wherein the secondary organic stabilizer is a phosphite.

31. Compositions according to claim 30, wherein the phosphite comprises from 0.05% to 5% by weight relative to the weight of the chlorinated polymer.

32. Compositions according to claim 31, wherein the phosphite comprises from 0.1% to 2% by weight relative to the weight of the chlorinated polymer.

33. Compositions according to claim 1, wherein the amorphous basic aluminum magnesium carbonate further comprises from 0.1% to 20% by weight of a polyol.

34. Compositions according to claim 33, wherein the amorphous basic aluminum magnesium carbonate further comprises from 1% to 10% by weight of a polyol.

35. Compositions according to claim 33, wherein the polyol is a sugar.

36. Compositions according to claim 35, wherein the sugar is sorbitol.

* * * * *